United States Patent
Panarello et al.

(10) Patent No.: US 7,957,623 B2
(45) Date of Patent: Jun. 7, 2011

(54) DEFORMABLE THERMAL PADS FOR OPTICAL FIBERS

(75) Inventors: Tullio Panarello, Saint-Lazare (CA); Marc Blanchet, Montreal (CA); Stephane Caplette, Boucherville (CA); Ghislain Lamothe, Saint-Lazare (CA)

(73) Assignee: Pyrophotonics Lasers Inc., Dollard-Des-Ormeaux, Quebec (CA)

( * ) Notice: Subject to any disclaimer, the term of this patent is extended or adjusted under 35 U.S.C. 154(b) by 200 days.

(21) Appl. No.: 12/234,471

(22) Filed: Sep. 19, 2008

(65) Prior Publication Data

US 2010/0074586 A1 Mar. 25, 2010

(51) Int. Cl.
*G02B 6/00* (2006.01)
(52) U.S. Cl. .................... 385/134; 385/94; 385/147
(58) Field of Classification Search .................... None
See application file for complete search history.

(56) References Cited

U.S. PATENT DOCUMENTS

| | | |
|---|---|---|
| 4,373,778 A | 2/1983 | Adham |
| 4,678,273 A | 7/1987 | Vilhelmsson |
| 4,890,896 A | 1/1990 | Meis |
| 5,524,167 A | 6/1996 | Ewert et al. |
| 6,809,930 B2 | 10/2004 | Mueller et al. |
| 6,937,796 B2 * | 8/2005 | Adams et al. .................... 385/40 |
| 7,060,525 B1 | 6/2006 | Tilly |
| 7,167,366 B2 | 1/2007 | Cheon |
| 2002/0001117 A1 | 1/2002 | Masghati et al. |
| 2002/0063951 A1 | 5/2002 | D'Almeida et al. |
| 2005/0232568 A1 | 10/2005 | Maurin |

OTHER PUBLICATIONS

"Thermoelectric cooling," Wikipedia entry, retrieved from the Internet from: << http://en.wikiedia.org/wiki/Thermoelectric cooling >>, 3 pages. total, Feb. 4, 2009.

* cited by examiner

*Primary Examiner* — Uyen-Chau N Le
*Assistant Examiner* — Chad H Smith
(74) *Attorney, Agent, or Firm* — Kilpatrick Townsend & Stockton LLP

(57) ABSTRACT

A system for fiber optic packaging includes a first substrate and a first deformable pad coupled to the first substrate. The first deformable pad is characterized by a thermal conductivity greater than 1 W/mK. The system also includes a fiber coil having at least a portion embedded in the first deformable pad to provide physical contact between the at least a portion of the fiber coil and the first deformable pad. The system further includes a second substrate coupled to the fiber coil and at least a portion of the first deformable pad.

21 Claims, 10 Drawing Sheets

DEFORMABLE THERMAL PADS FOR OPTICAL FIBERS

BACKGROUND OF THE INVENTION

The present invention relates generally to packaging of optical fibers. More particularly, an embodiment related to a method and system for packaging of an optical fiber coil in a compact form that provides efficient heat sinking, but with minimal stress on the optical fiber. The present invention is not limited to this particular application, but has a wider field of use.

High power fiber lasers, such as high power pulsed fiber lasers, typically employ a fiber design referred to as Large Mode Area (LMA) fiber. These fibers are inherently multi-mode, and thus generally produce multi-mode outputs from fiber lasers and/or fiber amplifiers. High power fibers may be doped fibers, for example, doped with Ytterbium at $6 \times 10^{26}$ ions/$m^3$. Coiling the fibers is generally used in many fiber system in order to package the fiber in a convenient, small size. The coiling of fibers has been a challenge for many applications, as coiling may perturb modal properties of the fibers, resulting in undesirable modes being favored over a more preferred fundamental mode. In particular, if the fiber in the coil is heated as a result of the high power optical signal propagating in the fiber, thermal stress may be induced due to the differential thermal expansions between the fiber and the material in contact with the fiber, such as a metallic mandrel. The induced stress may cause variation in the achieved modes, which is undesirable.

Thus, there is a need in the art for methods and systems for packaging of fiber optics for high power applications.

SUMMARY OF THE INVENTION

Embodiments of the invention provide exemplary designs of an optical fiber coiling package. The optical fiber coiling package may comprise at least one optical fiber, at least one deformable thermal pad, two clamping layers or a support structure and a jacket, and a cooling device. The coiling package may also comprise a temperature sensor. The deformable thermal pads surround the optical fiber coil for improved heat conduction. The fiber coiling may be packaged in one plane. The fiber coiling may also be wrapped on the support structure to have wraps in different planes. The coiling may be characterized by a first ring or wrap and a second ring or wrap that are free from contact with each other or other rings or wraps. The cooling device may help maintain the coiling package at a desired temperature. A controller may be used to obtain one or more signals from the temperature sensor to adjust the cooling device.

In one set of embodiments of the invention, the optical fiber may be coiled in a plane. For the fiber coil with a plurality of rings, each ring is free from contact with the next ring. The fiber coil may be embedded in at least one deformable thermal pad. The coil is partially in contact with the deformable thermal pad. In another embodiment, the coil may be embedded in two deformable thermal pads that are partially in contact with each other. Two clamping layers or substrates are located outside the deformable thermal pad or pads for holding the fiber coil and the pad or pads together. A cooling device and a temperature sensor may be attached to at least one of the clamping layers. The temperature sensor may provide a feedback signal to a controller that may adjust the cooling device to maintain the coiling package at a desired temperature.

In another set of embodiments of the invention, a fiber coil package for an optical fiber includes a support structure and a first deformable pad. The first deformable pad is characterized by a thermal conductivity greater than 1 W/mK. The fiber coil package further includes a length of the optical fiber, where at least a first portion of the length of the optical fiber is embedded in the first deformable pad to provide physical contact between the at least the first portion of the fiber coil and the first deformable pad. The fiber coil package also includes a jacket surrounding the optical fiber and at least a portion of the first deformable pad. Furthermore, the fiber coil package may include a second deformable pad coupled between the support structure and the jacket, where the second deformable pad is characterized by a thermal conductivity greater than 1 W/mK. In addition, at least a second portion of the length of the optical fiber is embedded in at least a portion of the second deformable pad to provide physical contact between the at least the second portion of the fiber coil and the second deformable pad, and the at least the portion of the second deformable pad is in contact with the at least the portion of the first deformable pad.

In a further embodiment of the invention, the deformable thermal pads comprise polymers, or elastomers. The deformable thermal pads including the polymers or elastomers may have thermal conductivity of 1 W/mK or greater. The deformable thermal pads may also comprise thermal greases with metallic fillers, which have a higher thermal conductivity.

In a particular embodiment, first and second deformable pads include a silicon-based thermal grease that contains metallic particles. A thermal conductivity of the silicon-based thermal grease is approximately 8 W/mK.

In a specific embodiment, the first substrate and the second substrate include a metal material, such as aluminum. The support structure or mandrel, or jacket may comprise metal materials, such as aluminum, for better heat conduction.

A different set of embodiments provides several cooling devices. In one specific embodiment, the cooling device may be a thermoelectric cooler attached to at least one of the clamping layers or jacket. In another specific embodiment, the cooling device may be a fluid or water tube attached to at least one of the clamping layers or jacket. Furthermore, a cooling fan may also be used to cool either the coiling package with a mandrel or coiling package with the coiling in one plane.

Numerous benefits are achieved using the present invention over conventional techniques. According to the embodiments of the invention, a fiber coil may be embedded in at least one or more deformable thermal pads, which helped with better thermal conduction. Additionally, external cooling devices such as thermoelectric coolers (TECs), fluid pipes carrying coolant like water, blowing fans further help maintain constant temperatures for the fiber coil with high power applications. For high power fibers, the improved temperature control in the optical fiber coil may reduce the thermal stress, and minimize the damage or breakage in the fiber. Furthermore, for LMA fibers that have areas of higher frequency modes, the reduced thermal stress also help achieve substantial mode discrimination through coiling. Depending upon the embodiment, one or more of these benefits may exist. These and other benefits have been described throughout the present specification and more particularly below.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components.

DETAILED DESCRIPTION OF THE INVENTION

A typical approach used for fiber coiling is to coil the optical fiber around a metallic mandrel for purposes of heat extraction. In one of the common designs, a fiber is wrapped around an oval shaped mandrel to have at least 5 loops of the fiber. The fiber is preferably fit inside a laser enclosure of a small size in comparison with the length of the fiber since miniaturization is one of the key features of a fiber laser. The fiber may be tightly wrapped around the mandrel to enhance heat conduction and the adjacent fibers often touch each other. A metal sleeve is usually attached to the mandrel on the outside edge of the fiber coil. The metal containing holder may not provide a uniform contact between the fiber and the metal containing holder at all the locations.

Furthermore, the fiber and the mandrel may expand differentially as laser power generates heat. This heat may cause undesirable thermal stress on the fiber. Moreover, such induced stress and temperature change may cause damage and breakage in the fiber. For example, high power fibers may be damaged near the output end, because the output end of the fiber is where the highest power density exists. Damage may also be found near a tight bend of a fiber coil, or a fused interface of two fibers.

The induced stress may also cause changes in fiber performance, such as induced depolarization of the light and change in the absorption spectrum of fiber dopants. Furthermore, for LMA fibers that support higher order modes, the ability to achieve substantial mode discrimination through coiling may be hindered due to the fact that minor variations in packaging of fibers or external stresses and strains may result in loss of mode control. Such variations may change the position of the fundamental and lower order modes, and thus may cause problems related to beam-pointing stability.

Figure 1A:
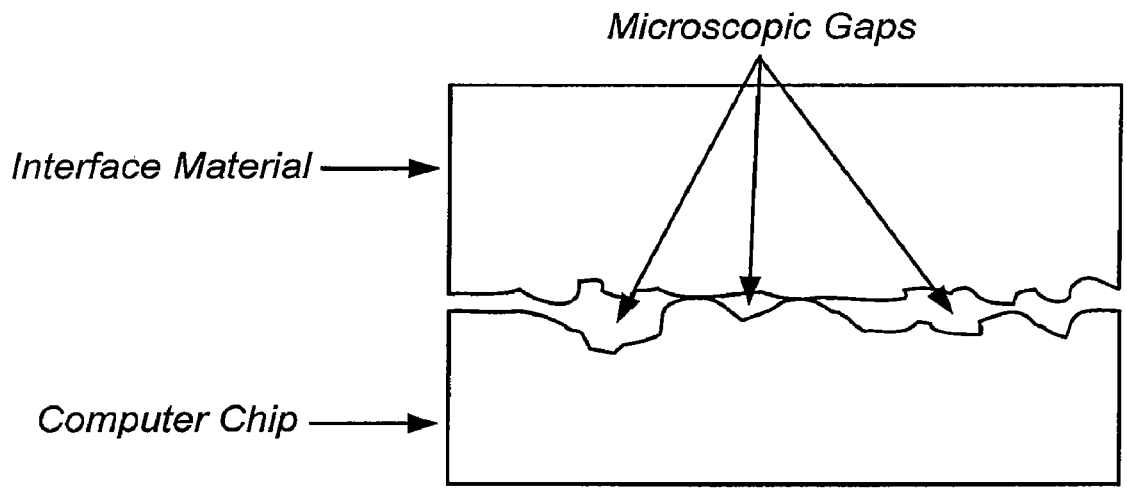
FIG. 1A shows an interface between two solid materials with microscopic gaps.

Embodiments of the present invention utilize deformable thermal pads in fiber packaging applications to reduce or solve one or more of the issues discussed above. Thermal interface resistance is the thermal resistance between two separate solid materials. No interface is smooth at a microscopic level, because any surface of a solid material may be considered to be rough at the microscopic level. FIG. 1A shows an interface between two solid materials with microscopic gaps. Note that the interface has peaks and valleys filled with air.

A deformable material may be added to an interface between two materials that are in contact. One feature provided by the deformable material is to displace air in the gaps between materials. Air has very low thermal conductivity, such as 0.03 W/mK, in comparison with other materials such as copper, e.g. 400 W/mK. Hence, using a deformable material between two other materials may result in heat transfer across the gaps in the interface by heat conduction through the deformable material, rather than heat conduction through the air. The heat conduction achieved using a deformable thermal material may be more efficient that that achieved without the deformable thermal material.

Deformable thermal pads have been used in electronic circuit applications. The thermal pads may have high thermal conductivity, coupled with the ability to plastically deform to conform to a non-planar surface, such as a circuit board. Thus, embodiments of the present invention utilize deformable thermal pads to increase the heat conduction of packages including coiled fibers.

In one embodiment of the invention, a polymer pad may be used as a deformable material. The pad may comprise polymers or elastomers. The polymers or elastomers may have a thermal conductivity between 1 W/mK and 5 W/mK. For example, a 3M Thermally Conductive Interface Pad 5592 may be used. The 3M Thermal Pad 5592 is silicon-based and has a thermal conductivity of 1.1 W/mK. The thermal pad may be sticky for easy fiber coil packaging.

Figure 1B:
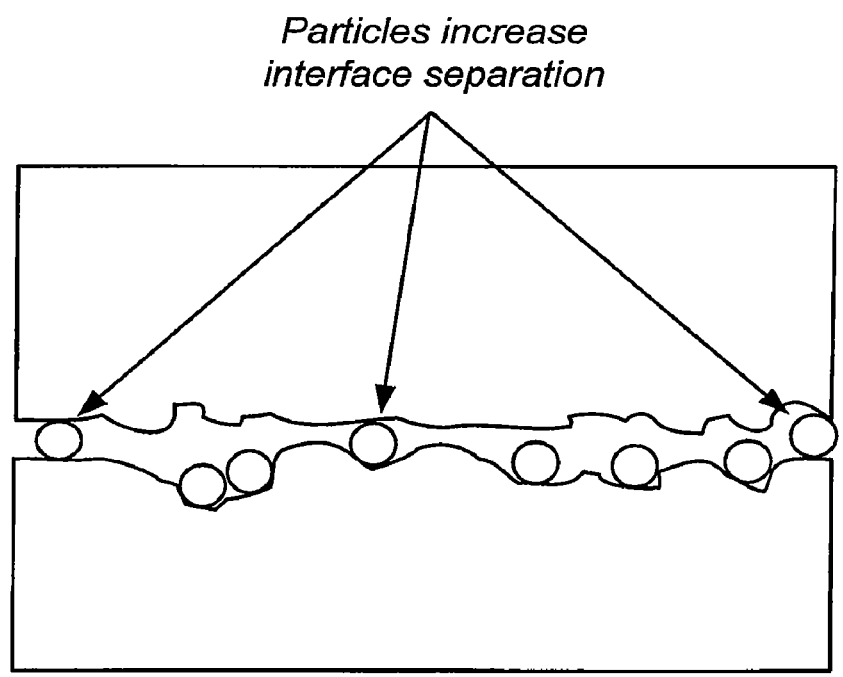
FIG. 1B shows an interface between two solid materials with the gaps filled by small particles.

In another embodiment of the invention, a thermal grease, such as a silicon-based thermal grease may be used as a deformable material. The thermal grease may have an ambient transition temperature between a solid state and a liquid state. The thermal grease behaves like a very viscous liquid. At elevated temperatures, which can result from heat dissipation from the fiber coils, the thermal grease may be in a liquid state. Generally, the silicon-based thermal grease may have a thermal conductivity between 2 and 3 W/mK. However, the thermal conductivity of the thermal grease may be increased significantly by adding metallic particles or fillers. For example, the thermal conductivity of a thermal grease with metal particles may be as high as 8 W/mK. FIG. 1B shows an interface between two solid materials with the gaps filled by small particles.

The thermal conductivity of the thermal grease may be increased further if the particles are on the same order or smaller than the roughness features of the interface, as the particles may fill the gaps created by the surface roughness. Therefore, the thermal resistance of the interface may be decreased.

Figure 2:
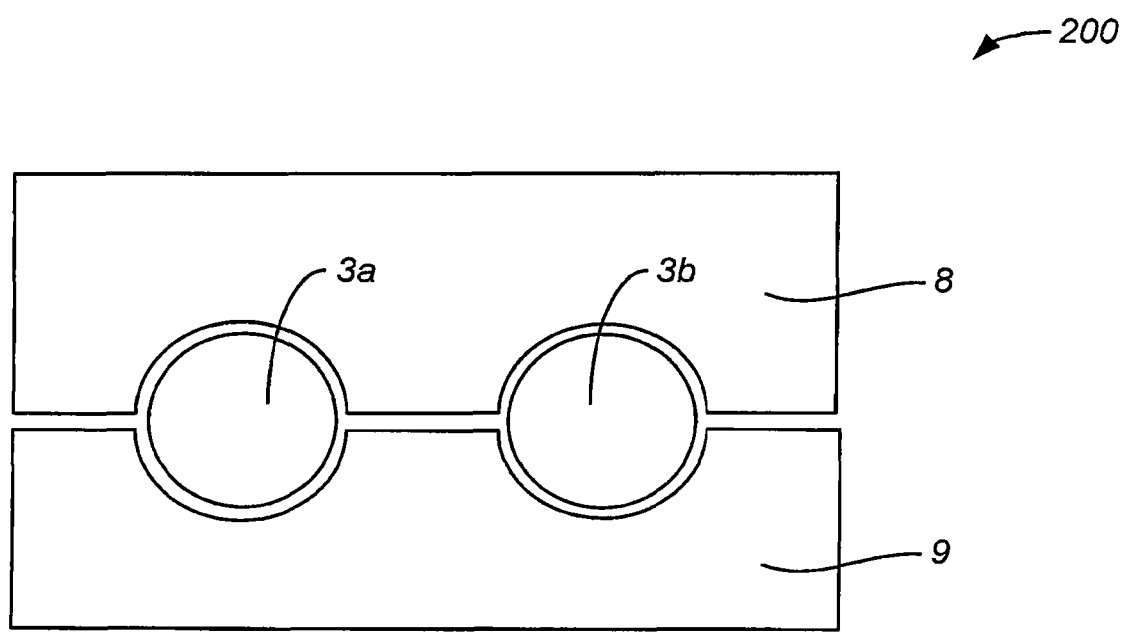
FIG. 2 is a simplified perspective (exploded) drawing illustrating a fiber package according to an embodiment of the present invention.

FIG. 2 is a simplified exploded view illustrating a fiber package 200 according to an embodiment of the invention. Fibers 3a and 3b are surrounded by two separate deformable thermal pads 8 and 9. Note that the fibers 3a and 3b are in contact with both thermal pads 8 and 9. The two thermal pads 8 and 9 also contact each other. At least one of the thermal pads 8 or 9 may function as a heat sink. The heat sinking may be active or passive.

It should be noted that fibers 3a and 3b as shown in FIG. 2 are not drawn to scale, as the fiber diameter may be significantly smaller than the thickness of the deformable pads. Optical fibers commonly include a central glass core, a glass cladding that surrounds the core, and a coating of synthetic polymer material. The core of a fiber may have a diameter less than 10 µm. The core may be made of silica. One or more cladding layers may surround the fiber core so that an overall diameter with the cladding layers may be less than 125 μm. The external diameter of a polymer coating may be approximately 250 μm. An improved covering has been proposed for high power optical fibers.

Figure 3:
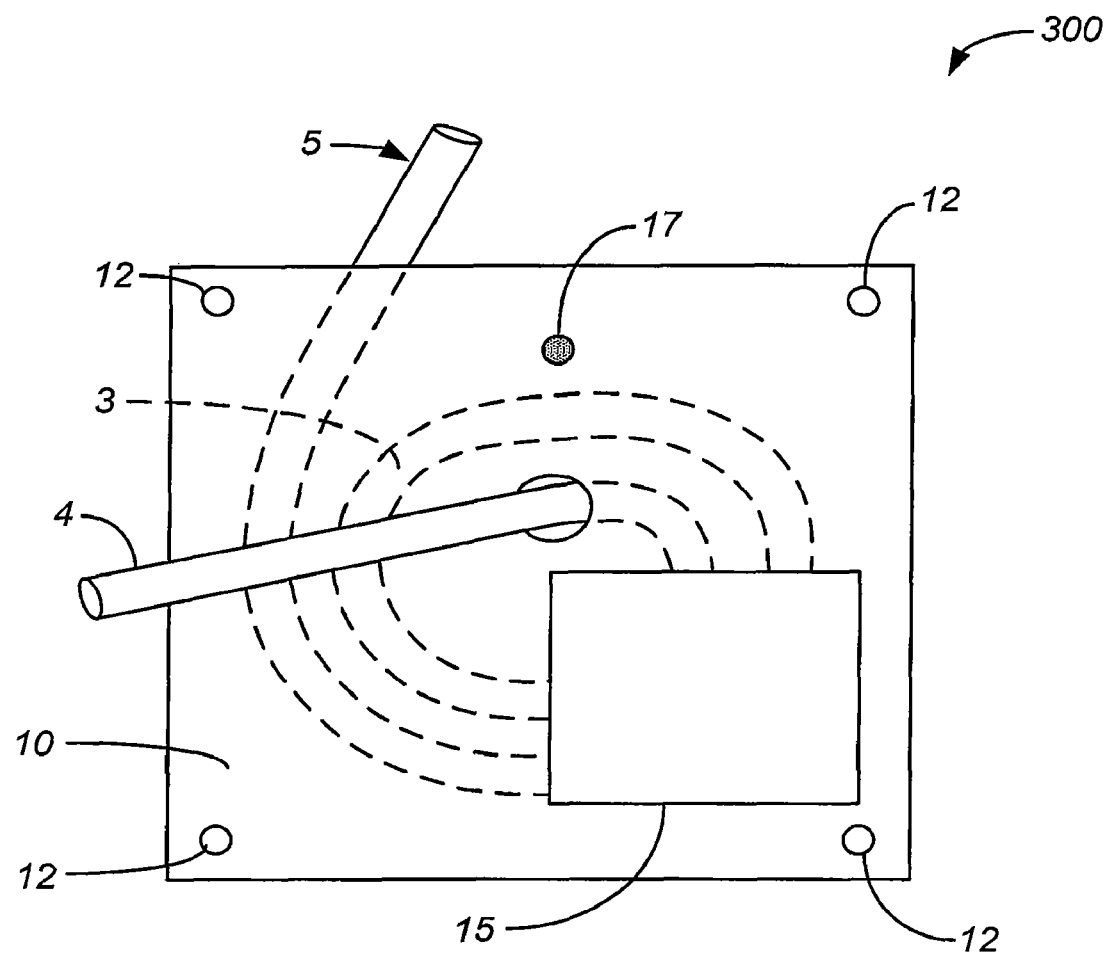
FIG. 3 is simplified top view of the fiber coil package illustrated in FIG. 2.

FIG. 3 is a simplified top view of the fiber coil package 300. The fiber coil package 300 includes a fiber coil 3 with an input end 4 and an output end 5, an upper clamping layer 10, and an upper temperature maintenance device 15. The input end 4 may extend outside the clamping layer 10 from the center of the fiber coil loop 3, while the output end 5 may extend outside the clamping layer 10 from the edge. The clamping layer 10 covers the coiling package area for the fiber 3. The temperature maintenance device 15 may overlap partially with the clamping layer 10. A temperature sensor 17 may also be attached to the clamping layer 10.

Figure 4A:
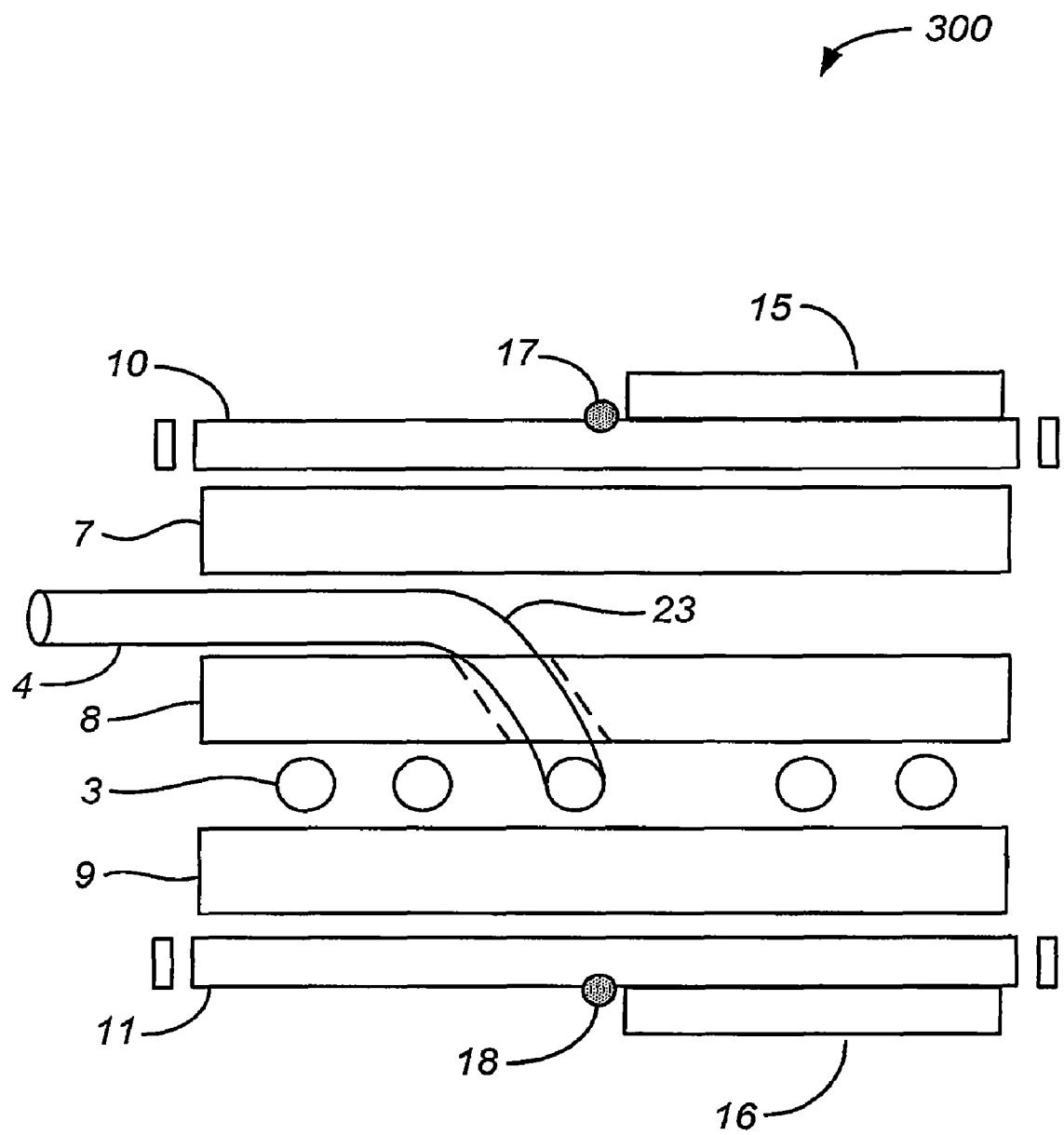
FIG. 4A is a simplified cross-sectional view of the fiber package (pre-assembly) illustrated in FIG. 2.

FIG. 4A is a simplified cross-sectional side view of the fiber coil package 300 (pre-assembly). In this view, fiber coil 3 is sandwiched between a middle deformable thermal pad 8 and a lower deformable thermal pad 9, but an end 4 of the fiber 3 may extend outside an upper deformable thermal pad 7 and the middle deformable thermal pad 8. The upper clamping layer 10 may be located above the upper thermal pad 7, while the lower clamping layer 11 may be located below the thermal pad 9. The two clamping layers may help hold the fiber coil 3 and the thermal pads 7-9 together by clamping means 12 at four corners as shown in FIG. 3.

The upper temperature maintenance device 15 and an lower temperature maintenance device 16 may be attached to the upper and lower clamping layers 10 and 11, respectively. The temperature maintenance devices 15 and 16 may comprise a water tube or fluid tube, a thermoelectric cooler or a fan.

Furthermore, two temperature sensors 17 and 18 may be attached to the upper clamping layer 10 and the lower clamping layer 11, respectively, where the sensor 17 may be located on the opposite side of the upper deformable thermal pad 7, and the sensor 18 may also be located on the opposite side of the lower deformable thermal pad 9.

Figure 4B:
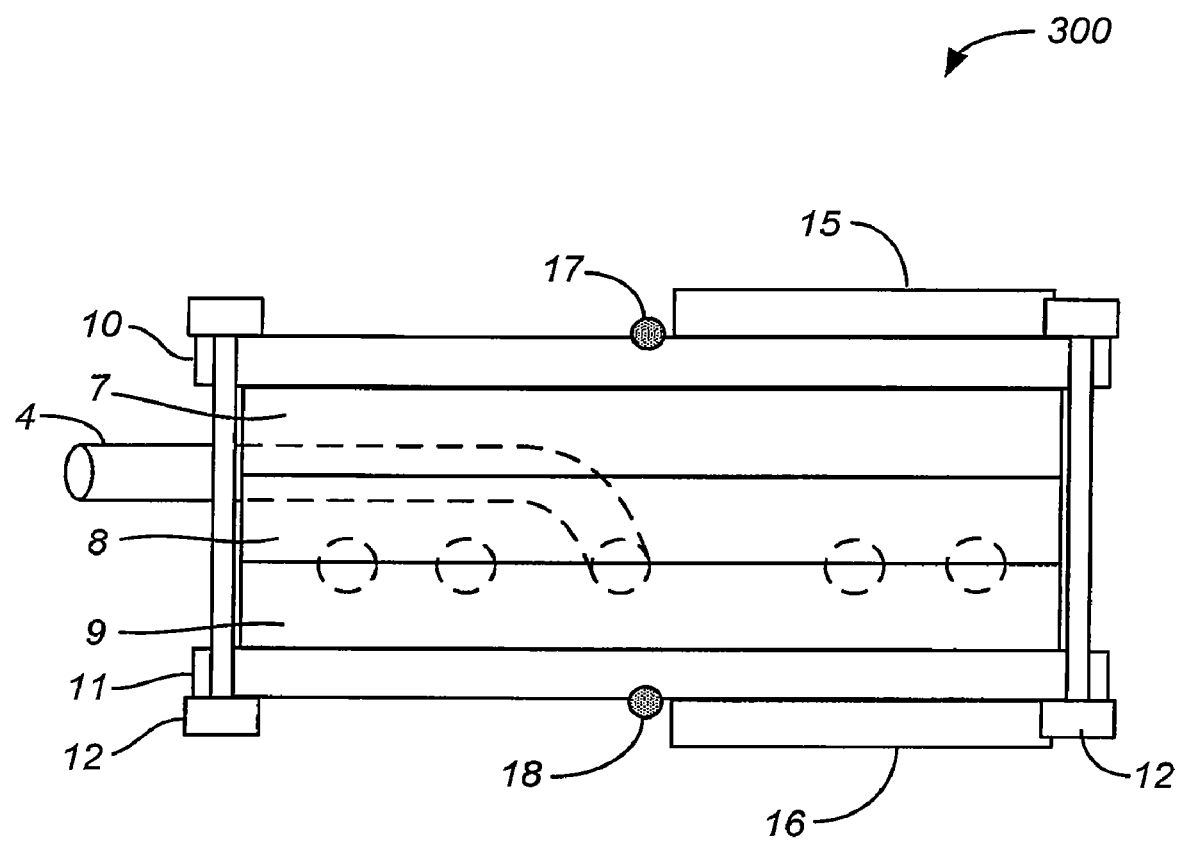
FIG. 4B is a simplified cross-sectional view of the fiber package (post-assembly) illustrated in FIG. 2.

There may be a gradual bend in the fiber coil 3 near location 23. In one embodiment, the input end 4 of the fiber coil 3 may enter between the upper deformable pad 7 and the middle deformable pad 8, as shown in FIGS. 4A and 4B. In another embodiment, the input end 4 may also enter through a hole in the upper clamping layer 10 without using the extra deformable thermal pad layer 7 (not shown). The input end 4 may be a preferable bending location, as the power density at the input end 4 may be lower than other locations along the fiber coil 3, such as output end 5. Therefore, less damage may be caused to the input end 4 as a result of bending. The output end 5 of the fiber coil 3 may exit the coil package 300 in the same plane as the coil loop (not shown in FIG. 4A) to avoid any bending near the output end 5 where the power density may be the highest.

FIG. 4B is a simplified cross-sectional view of the fiber coil package 300 (post-assembly). This cross-sectional view illustrates that the fiber coil 3 is surrounded by thermal pads 7, 8 and 9, and contacts with the thermal pads 7, 8 and 9. Additionally, all the thermal pads contact at least one of the other thermal pads. For example, the lower thermal pad 9 contacts the middle thermal pad 8, which contacts with the upper thermal pad 7. The clamp 12 may be used to hold the upper and lower clamping layers 10 and 11 that sandwich the fiber coil 3 and thermal pads 7-9 in the middle of the clamping layers 10 and 11. The clamp 12 may make contact with the thermal pads at multiple, e.g., four corners, as shown in FIG. 3.

It will be recognized by those skilled in the art that various alternative constructions are possible within the scope of the present invention. For example, it is possible to use any number of deformable pads without departing from the scope of the present invention. In one alternative embodiment, deformable pads 8 and 9 may not be used such that the fiber coil 3 is in direct contact with the lower clamping layer 11, deformable pad 7 may be located on top of the fiber coil 3, and the upper clamping layer 10 above the deformable pad 7. In some embodiment, deformable pads 7 and 8 may not be used, but pad 9 may be used.

Figure 5:
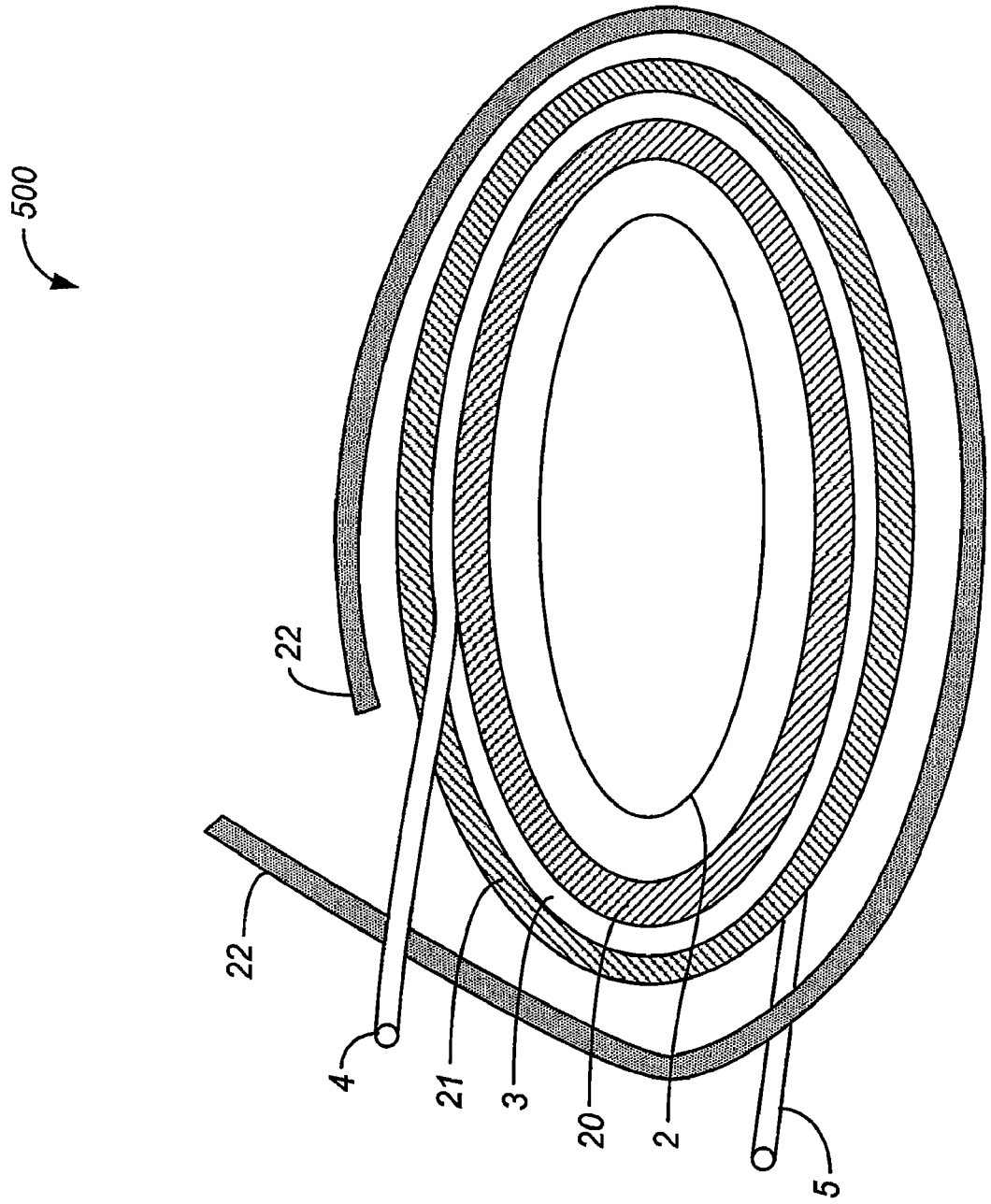
FIG. 5 is a simplified top view of a fiber coil package with a support structure for an optical fiber according to an embodiment of the present invention.

FIG. 5 is a simplified top view of an exemplary optical fiber coil package with a support structure 500. The coil package with a support structure 500 includes a mandrel or spool 2, an inner deformable thermal pad 20, a fiber coil 3, an outer deformable thermal pad 21, and a jacket 22. The inner deformable thermal pad 20 is wrapped around the mandrel 2. The fiber coil 3 is sandwiched between the inner deformable thermal pad 20 and the outer deformable thermal pad 21. The jacket 22 is located outside the outer deformable thermal pad 21 for packaging all the components described above. The two ends 4 and 5 of the fiber coil 3 may extend outside the deformable thermal pads 20 and 21. The mandrel 2 may have an oval shape, and may be made of a metal or metal alloy, such as aluminum. The jacket 22 may also be made of a metal or metal alloy for better heat conduction. In a particular embodiment, the inner deformable thermal pad 20 may not be utilized. The fiber coil 3 may directly wrap on the mandrel 2. Alternatively, in another embodiment, the outer deformable pad 21 may not be used.

In a specific embodiment, the fiber coil 3 of a length of about 5 meters may be wrapped around the mandrel 2 to have at least 5 or more wraps. Each of the wraps may not contact other wrap. Also, each wrap may be uniformly spaced from the next wrap. By this way, more uniform heat dissipation may be achieved through the deformable thermal pads 20 and 21. At least one of the deformable thermal pads 20 or 21 may function as a heat sink. The temperature maintenance device 15 or 16 may be attached to at least one of the clamping layers 10 or 11.

Figure 6:
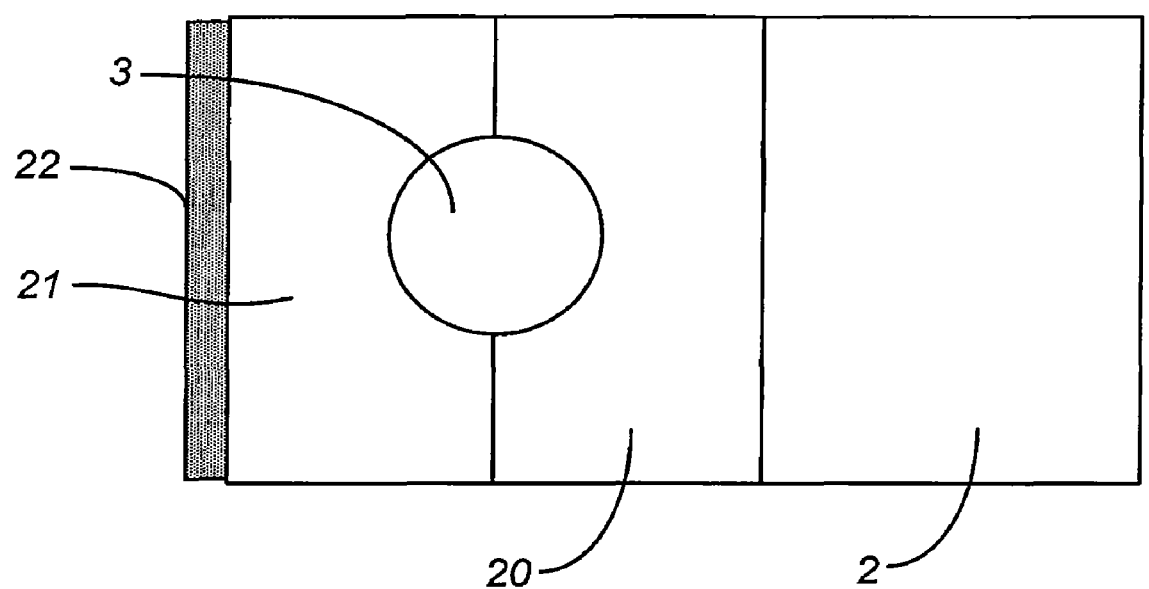
FIG. 6 is a simplified cross-sectional view of the a fiber coil package with a support structure illustrated in FIG. 5.

FIG. 6 is a simplified cross-sectional view (exploded) of the coil package with a support structure 500 illustrated in FIG. 5. Note that the fiber coil 3 is surrounded by two deformable thermal pads 20 (inner) and 21 (outer). The mandrel 2 is located next to the inner deformable thermal pad 20, while the jacket 22 is located next to the outer deformable thermal pad 21.

Figure 7:
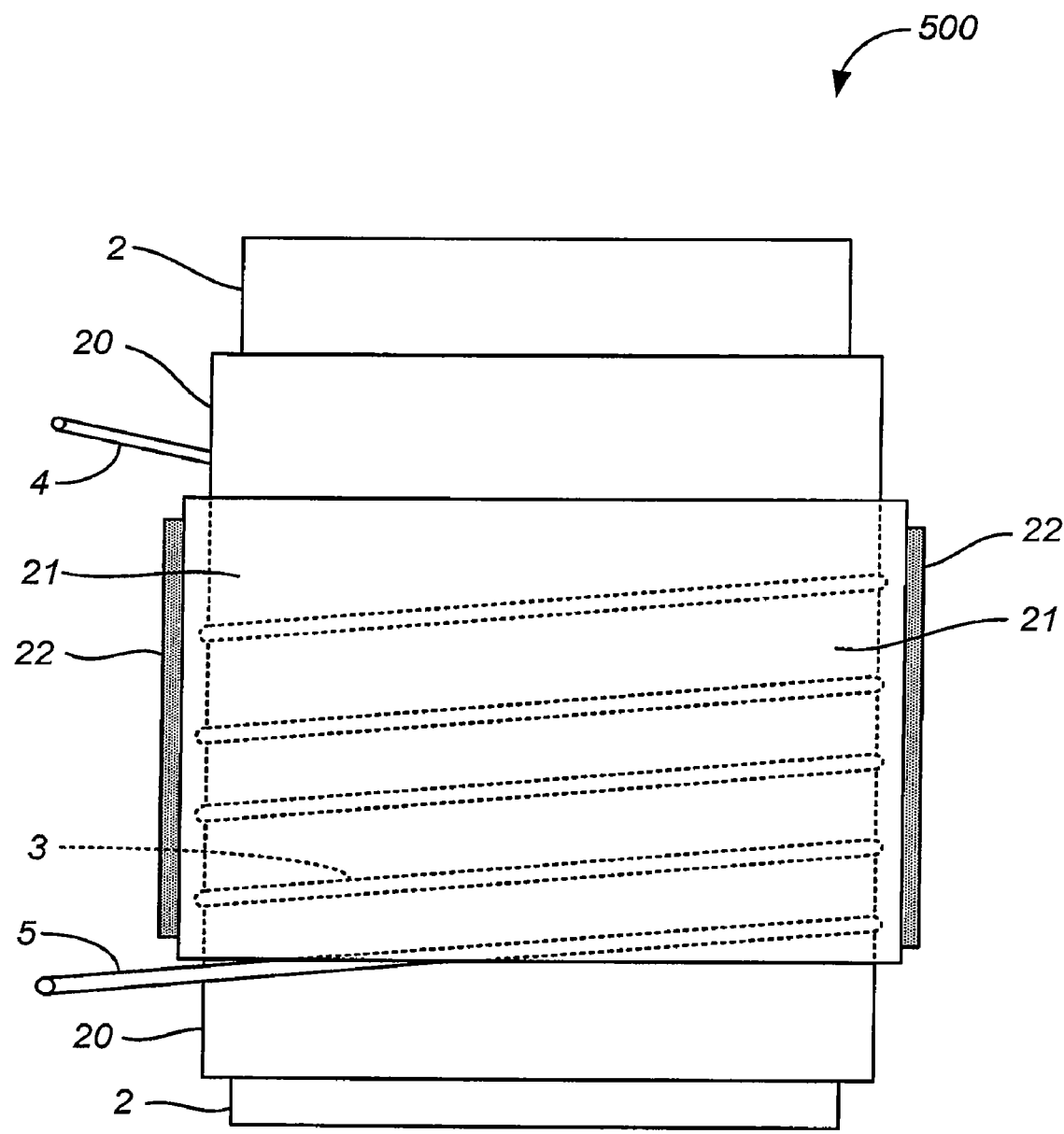
FIG. 7 is a simplified perspective view of the a fiber coil package with a support structure illustrated in FIG. 5.

FIG. 7 is a perspective view of the coil package with a support structure 500. Note that the mandrel 2 is in the center of the support structure 500. The inner deformable thermal pad 20 is wrapped around the mandrel 2. The fiber coil 3 with two ends 4 and 5 in contact with thermal pads 20 and 21 may extend outside the deformable thermal pad 20. The outer deformable thermal pad 21 may be sufficient to cover the fiber coil 3, but may be shorter than the inner thermal pad 20 along the central axis. The jacket 22 may cover the outer deformable thermal pad 21. The two ends 4 and 5 may be spaced at a distance along the vertical central axis of the support structure, because each wrap of the fiber may not contact the next wrap and may be spaced uniformly from the next wrap. Such a configuration may allow the thermal pad 20 and/or 21 to provide for uniform heat dissipation.

It will be recognized by those skilled in the art that various alternative constructions are possible within the scope of the present invention. For example, it is possible to use any number of deformable pads without departing from the scope of the present invention. Thus, in a particular embodiment, inner deformable pad 20 may be omitted so that the optical fiber coil 3 is wrapped directly on the mandrel 2. Additionally, the outer deformable pad 21 may be placed or wrapped around the fiber coil 3 with the jacket 22 covering the outer deformable pad 21. In an alternative embodiment, the inner deformable pad 20 may be omitted but the outer deformable pad 21 may be included.

Figure 8:
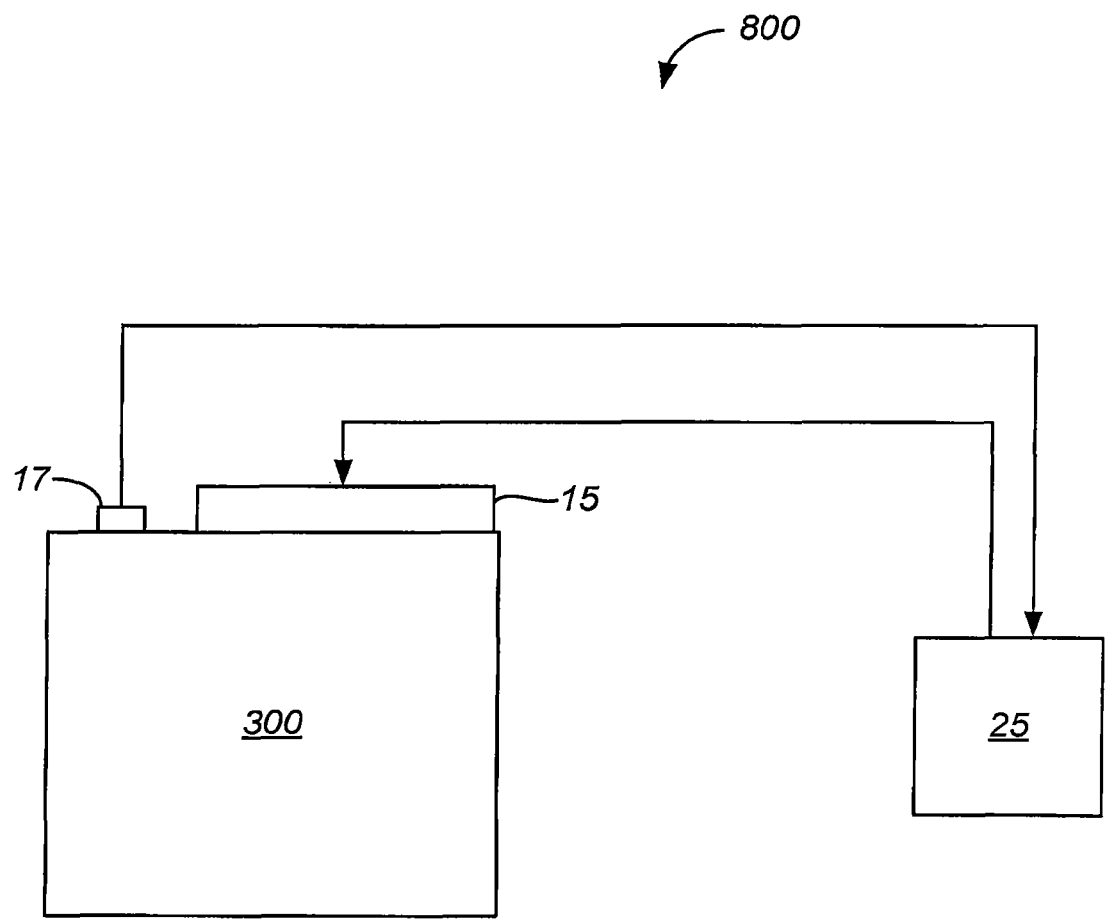
FIG. 8 is a simplified schematic diagram of a thermal management system according to an embodiment of the present invention.

FIG. 8 is a simplified schematic diagram of a thermal management system 800. The system 800 includes a controller 25, a cooling device 15, and the fiber coil package 300. The system 800 may contain one or more temperature sensors 17. The temperature sensor 17 may be attached to the fiber coil package 300. The sensor 17 may be coupled to the controller 25, which is allowed to receive feedback signals from the temperature sensors 17 and 18 to regulate the temperature maintaining devices 15 and 16.

In one embodiment, the temperature maintenance device 15 may be attached to the fiber coil package 300. The cooling device may a tube with fluid or coolant, such as water. By adjusting flow rates, temperature of the fluid, dimensions of the tube or types of coolants, heat may be dissipated from the fiber coil package 300. The temperature of the fiber coil package 300 may be maintained by the controller 25 based upon the feedback signals received from the temperature sensor 17 or 18.

In another embodiment, the temperature maintenance device 15 or 16 may be a thermoelectric cooler (TEC) using a Peltier effect. A Peltier cooler or a thermoelectric heat pump is a solid-state active heat pump that transfers heat from one side of the device to the other side against a temperature gradient. The Peltier cooler consumes electric energy. By applying a DC voltage to the Peltier cooler to cause one side to cool, the effectiveness of heat removal of the pump may be dependent upon the amount of current that is provided to the TEC. The feedback signals from the temperature sensor 17 or 18 may allow the controller 25 to adjust the current in order to maintain the clamping layers 10 and 11 at desired temperatures.

In a further embodiment, the cooling device may be a fan for blowing the jacket 22 or mandrel 2 (not shown in FIGS. 5 and 7) for either the coil package 300 or the coil package with a mandrel 500.

Controlling the temperature of the fiber coil package 300, for example, by using a fluid tube a thermoelectric cooler or a fan, may help reduce thermal stress as a result of heating from high power fibers. The fiber coil package 300 or 500 may also be cooled by using a fan may also help reduce the thermal stress. One of the ordinary skill in the art would recognize many variations, modifications, and alternatives. A combination of the cooling techniques may also be used. A cooling device may be attached to the jacket 22 of the fiber coil package 500.

By maintaining a constant temperature of the coil package during high power application, induced stress on the optical fibers may be reduced as a result of heat generation from the high power, which may reduce the damage or breakage as discussed earlier. Furthermore, uniform heat dissipation as described herein may allow the control of desired modes by minimizing the variations from the induced stress.

Figure 9:
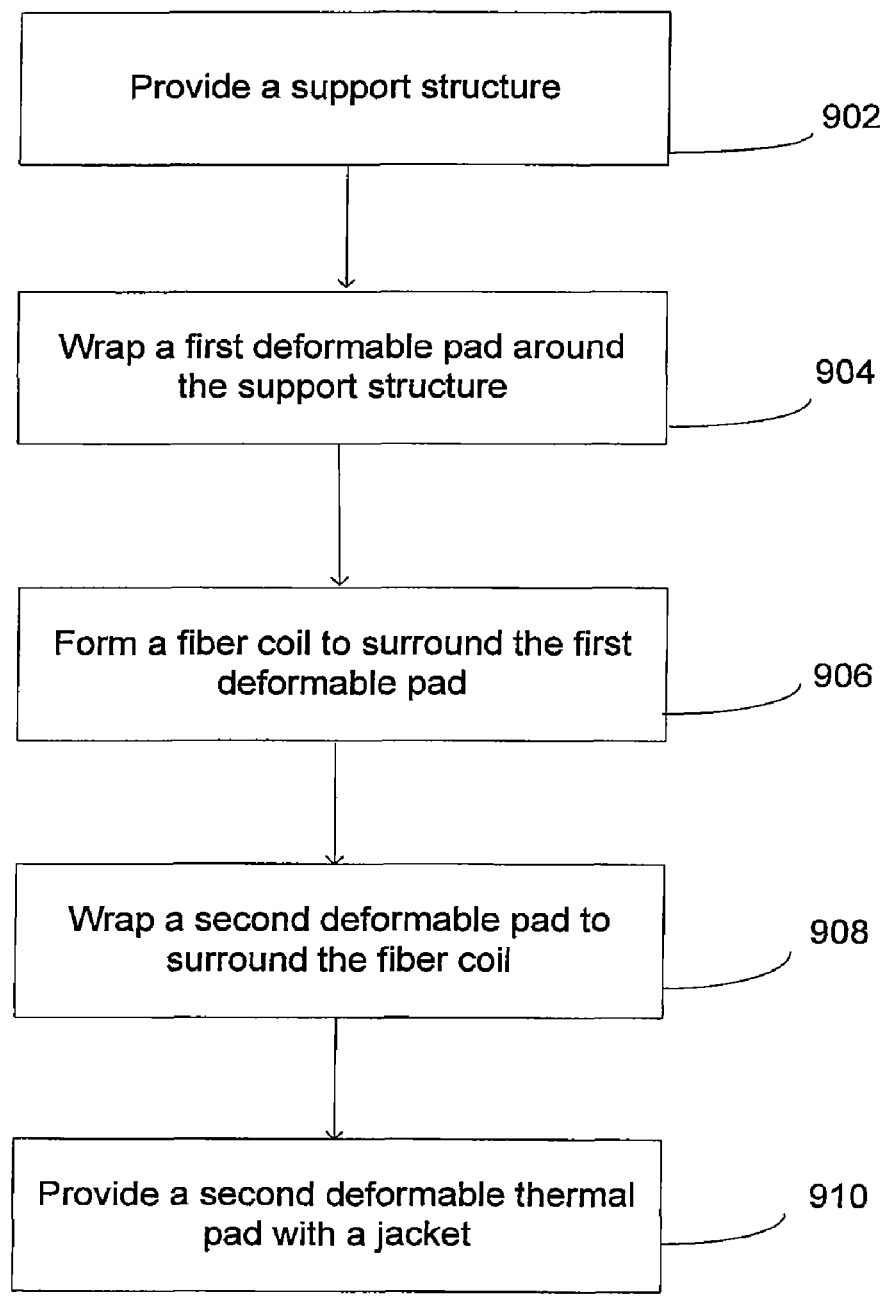
FIG. 9 is a flow diagram illustrating a process for packaging a fiber coil around a support structure.

In some embodiments, a method of packaging an optical fiber is provided. FIG. 9 is a flow diagram illustrating a simplified process for packaging a fiber coil around a support structure as shown in FIG. 7. The process starts by providing a support structure at block 902. The process continues by wrapping or placing a first deformable pad to surround the support structure at block 904. Then, a fiber coil is wrapped around the first deformable pad at block 906 such that each ring of the coil is free from contact the next ring. The fiber coil is wrapped in such a way that a first portion of the length of the optical fiber coil positioned at a first distance from an end of the support structure and a second portion of the length of the optical fiber coil positioned at a second distance from the end of the support structure adjacent to the first portion, wherein the second portion is free from contact with the first portion.

In further embodiments, the method provides wrapping or placing a second deformable pad to surround the fiber coil at block 908 and providing a jacket to surround at least a portion of the second deformable pad at block 910. In a particular embodiment, the first deformable pad may not be needed so that the fiber is wrapped on the support structure.

It should be appreciated that the specific steps illustrated in FIG. 9 provide a particular method of packaging a fiber coil around a support structure according to an embodiment of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A system for fiber optic packaging, the system comprising:
    a first substrate;
    a first deformable pad coupled to the first substrate, wherein the first deformable pad is characterized by a thermal conductivity greater than 1 W/mK;
    a fiber coil having at least a portion embedded in the first deformable pad to provide physical contact between the at least a portion of the fiber coil and the first deformable pad; and
    a second substrate coupled to the fiber coil and at least a portion of the first deformable pad, wherein the first substrate and the second substrate comprise a metal material.

2. The system of claim 1 further comprising a second deformable pad coupled between the first substrate and the second substrate, wherein the second deformable pad is characterized by a thermal conductivity greater than 1 W/mK and wherein at least a second portion of the fiber coil is embedded in at least a portion of the second deformable pad to provide physical contact between the at least the second portion of the fiber coil and the second deformable pad.

3. The system of claim 2 wherein the first deformable pad and the second deformable pad comprise at least one of polymers or elastomers.

4. The system of claim 2 wherein the at least the portion of the second deformable pad is in contact with the at least the portion of the first deformable pad.

5. The system of claim 1 wherein a first ring of the fiber coil is free from contact with a second ring of the fiber coil, the first ring and the second ring being disposed in a same plane.

6. The system of claim 5 wherein:
- an input end of the fiber coil is bent against the plane of the coil, the input end being characterized by a first power density; and
- an output end of the fiber coil is in the same plane as the coil, the output end being characterized by a second power density greater than the first power density.

7. The system of claim 1 further comprising a tube configured to carry a fluid for cooling, wherein the tube is thermally coupled to at least one of the first substrate or the second substrate.

8. The system of claim 1 further comprising a thermoelectric cooler coupled to at least one of the first substrate or the second substrate.

9. The system of claim 1 further comprising at least one sensor for detecting a temperature of at least one of the first substrate or the second substrate.

10. The system of claim 9 further comprising a controller coupled to the sensor for adjusting the temperature of at least one of the first substrate or the second substrate.

11. The system of claim 1 further comprising at least one cooling fan attached to at least one of the first substrate or the second substrate.

12. A system for fiber optic packaging, the system comprising:
- a first substrate;
- a first deformable pad coupled to the first substrate, wherein the first deformable pad is characterized by a thermal conductivity greater than 1 W/mK;
- a fiber coil having at least a portion embedded in the first deformable pad to provide physical contact between the at least a portion of the fiber coil and the first deformable pad;
- a second substrate coupled to the fiber coil and at least a portion of the first deformable pad; and
- a tube configured to carry a fluid for cooling, wherein the tube is thermally coupled to at least one of the first substrate or the second substrate.

13. The system of claim 12 further comprising a second deformable pad coupled between the first substrate and the second substrate, wherein the second deformable pad is characterized by a thermal conductivity greater than 1 W/mK and wherein at least a second portion of the fiber coil is embedded in at least a portion of the second deformable pad to provide physical contact between the at least the second portion of the fiber coil and the second deformable pad.

14. The system of claim 13 wherein the first deformable pad and the second deformable pad comprise at least one of polymers or elastomers.

15. The system of claim 13 wherein the at least the portion of the second deformable pad is in contact with the at least the portion of the first deformable pad.

16. The system of claim 12 wherein a first ring of the fiber coil is free from contact with a second ring of the fiber coil, the first ring and the second ring being disposed in a same plane.

17. The system of claim 16 wherein:
- an input end of the fiber coil is bent against the plane of the coil, the input end being characterized by a first power density; and
- an output end of the fiber coil is in the same plane as the coil, the output end being characterized by a second power density greater than the first power density.

18. The system of claim 12 further comprising a thermoelectric cooler coupled to at least one of the first substrate or the second substrate.

19. The system of claim 12 further comprising at least one sensor for detecting a temperature of at least one of the first substrate or the second substrate.

20. The system of claim 19 further comprising a controller coupled to the sensor for adjusting the temperature of at least one of the first substrate or the second substrate.

21. The system of claim 12 further comprising at least one cooling fan attached to at least one of the first substrate or the second substrate.

* * * * *